United States Patent [19]

Jäger et al.

[11] 4,114,864

[45] Sep. 19, 1978

[54] DEVICE FOR REMOVAL OF SMOKE GASES, DUST AND THE LIKE

[75] Inventors: Albert Jäger, Rommelhausen; Alfred Lucht, Bickenbach; Gerhard Münch, Frankfurt am Main, all of Germany

[73] Assignee: Messer Griesheim GmbH, Frankfurt am Main, Germany

[21] Appl. No.: 733,993

[22] Filed: Oct. 20, 1976

[30] Foreign Application Priority Data

Oct. 28, 1975 [DE] Fed. Rep. of Germany ....... 2548078

[51] Int. Cl.² .............................................. B23K 7/06

[52] U.S. Cl. .................................... 266/51; 266/158; 432/72; 98/115 VM; 261/DIG. 9

[58] Field of Search .............................. 110/119, 8 A; 126/299 D; 432/72, 75; 98/115 R, 115 VM; 266/48, 144, 158, 51; 261/DIG. 9, 115; 55/355, 385 D; 202/263

[56] References Cited

U.S. PATENT DOCUMENTS

| | | | |
|---|---|---|---|
| 2,441,474 | 5/1948 | Deitrich | 432/88 |
| 3,176,971 | 4/1968 | Hulton et al. | 266/158 |
| 3,332,675 | 7/1967 | Bandura et al. | 266/158 |
| 3,334,471 | 8/1967 | Herron | 261/115 |
| 3,572,264 | 3/1971 | Mercer | 261/DIG. 9 |
| 3,827,343 | 8/1974 | Darm | 126/299 D |
| 3,926,104 | 12/1975 | El Dorado | 266/144 |
| 3,955,484 | 5/1976 | Hirahama et al. | 98/115 VM |
| 3,971,642 | 7/1976 | Perez | 261/DIG. 9 |
| 4,026,200 | 5/1977 | Lindquist | 98/115 VM |

*Primary Examiner*—John J. Camby
*Assistant Examiner*—Henry C. Yuen
*Attorney, Agent, or Firm*—Connolly and Hutz

[57] ABSTRACT

A device for removing smoke gases, dust and the like from a workpiece to be flamed includes a suction hood mounted on a movable flaming machine located before the flame burner as seen in the flame direction and is characterized by the hood being connected by a first duct to a trough to which a second duct communicates with a filter apparatus being at the free end of the second duct.

11 Claims, 4 Drawing Figures

DEVICE FOR REMOVAL OF SMOKE GASES, DUST AND THE LIKE

BACKGROUND OF THE INVENTION

The invention is concerned with a device for removal of smoke gases, dust and the like from a workpiece to be flamed with a suction hood attached before the flame burner — as seen in the flaming direction — of a flaming machine.

Upon flaming workpieces, as for example slabs, blocks, etc., unhealthy smoke gases build up, dirt or dust is stirred up and furthermore, slag also results. The health related harmful materials (smoke, gas, dust) especially, must be removed immediately and completely from the flaming area. For the removal of these harmful materials, devices have already been proposed, which, however, could only find applications with stationary flaming machines on account of their construction or make-up.

SUMMARY OF THE INVENTION

The object of the invention is to provide an arrangement for the removal of smoke gases, dust and the like, which lends itself especially to mobile flaming or scarfing machines.

For accomplishing this object the suction hood is connected, via a first duct to a trough, to which a second duct is attached, at the free end of which, a filtration apparatus is provided.

For assurance that the arrangement can also function optimally, the suction hood is coupled to the flaming machine. This coupling can take place mechanically, for example, through a rigid connection, so that on the one hand, a drive can simply be provided for the movement of the flaming machine and the suction hood and otherwise a constant distance is always maintained between the flame burner and the suction hood. Instead of this mechanical coupling, it is likewise possible to couple the flaming machine and the mobile suction hood to one another by means of an electrical synchro-tie. In this case, it is possible to interrupt the coupling, so that the flaming machine and the suction hood can be moved separately.

For spacing reasons, it is furthermore advantageous if the suction hood and the flaming machine can be moved on the same rail track. As a result of this, it is possible, without difficulty, to equip flaming machines already found in use as well as subsequently, the arrangement of the invention for removal of smoke gases, dust the like, since except for the lateral installation of the relatively small trough, no additional space is required.

In accordance with the invention the suction hood is carried by a frame which is made movable by means of tread rollers on the tracks. In order to avoid taking up too much infiltrated air during operation by the suction hood, the suction hood is cone shaped and its smaller face is opened toward the flame burner. This face opening is so proportioned so that the fan shaped spreading flame jet can be completely taken up.

Because of the ever widening suction hood, in the flame jet direction, there results a larger amount of room so that as a result of this — caused by the reduction in pressure — the velocity of the flame jet also becomes smaller.

In order to throttle this kinetic energy of the flame jet, inside the suction hold are installed one or more chain curtains which reach up to the workpiece. These chain curtains serve, in the first place, to brake the stirred up and propelled granulated slag particles in their flight path so that these fall back upon the workpiece and are moved ahead together with the flame stream along the surface of the workpiece until they fall into a slag receptacle or the like at the end of the workpiece.

Since, in practice, a single flame burner is often used to flame or scarf the complete face of a workpiece, the flame track is shifted by the amount of its width, after having flamed the first flame track, in order to flame the next track. In order to avoid using a suction hood whose opening, the one that is turned toward the flame burner, stretches over the combined surface of the workpiece (often up to 2500mm), the suction hood is installed perpendicular to the flame direction and mobile in the frame. In this manner, it is possible to keep the entry opening relatively small; that is to say, just big enough so that the flame jet can completely enter the inside of the hood. It is thereby further avoided having too much infiltrated air sucked into the suction hood.

Since the first duct dips into the trough and thereby, for reasons on construction, cannot travel along laterally with the suction hood (perpendicular to the flame direction), the first duct is rigidly connected to the frame as well as telescopically connected to the outlet duct attached to the laterally sliding suction hood. Through this, it is advantageously assured that a connection with the trough is guaranteed in every position of the suction hood in the frame.

Since, as previously mentioned, the inventive arrangement is intended for a movable flaming machine, it is further proposed that a container which is extendable over the entire flame path be provided, the inlet opening of which is equipped for permanent incorporation with the first pipe which is movable lengthwise with the frame; the inlet opening of the trough for the first pipe extends thus over the total trough length (equal to length of the flame path) so that, thereby, the first duct freely introduced into the trough can be moved in it without hindrance.

In order to prevent the smoke gases brought into the trough through the extended inlet opening from streaming back into the environment, the trough is syphon shaped and a water bath is provided in it as a seal.

In this context the first duct has a U-shape and its outlet flow into the area of the trough is sealed by the water bath. The harmful smoke gases, dust and other contamination sucked out of the flaming area cannot return once they have reached the trough, but accumulate in this sealed trough area from which they are sucked out via the second duct, the free end of which is connected with a stationary vacuum blower.

To this vacuum fan, a filter is connected in advantageous fashion through which not only are the dust and slag particles pulled along by the smoke gases separated, but through which, in the first place the harmful smoke gases are to be cleansed that the air which finally flows out of the filter into the environment is free of harmful materials and is therby "environmentally sound".

In order to send as few as possible particles to the filter, a spray arrangement is installed on at least one of the walls enclosing the water free area of the trough. With this spray arrangement, the solid particles (dust, slag) pulled along by the smoke gases are bound by a water mist and end up in this manner in the water bath of the trough. As a result of this precleaning of the smoke gases, the expensive filter is not as loaded and thereby has essentially a longer life.

THE DRAWINGS

DETAILED DESCRIPTION

Figure 1:
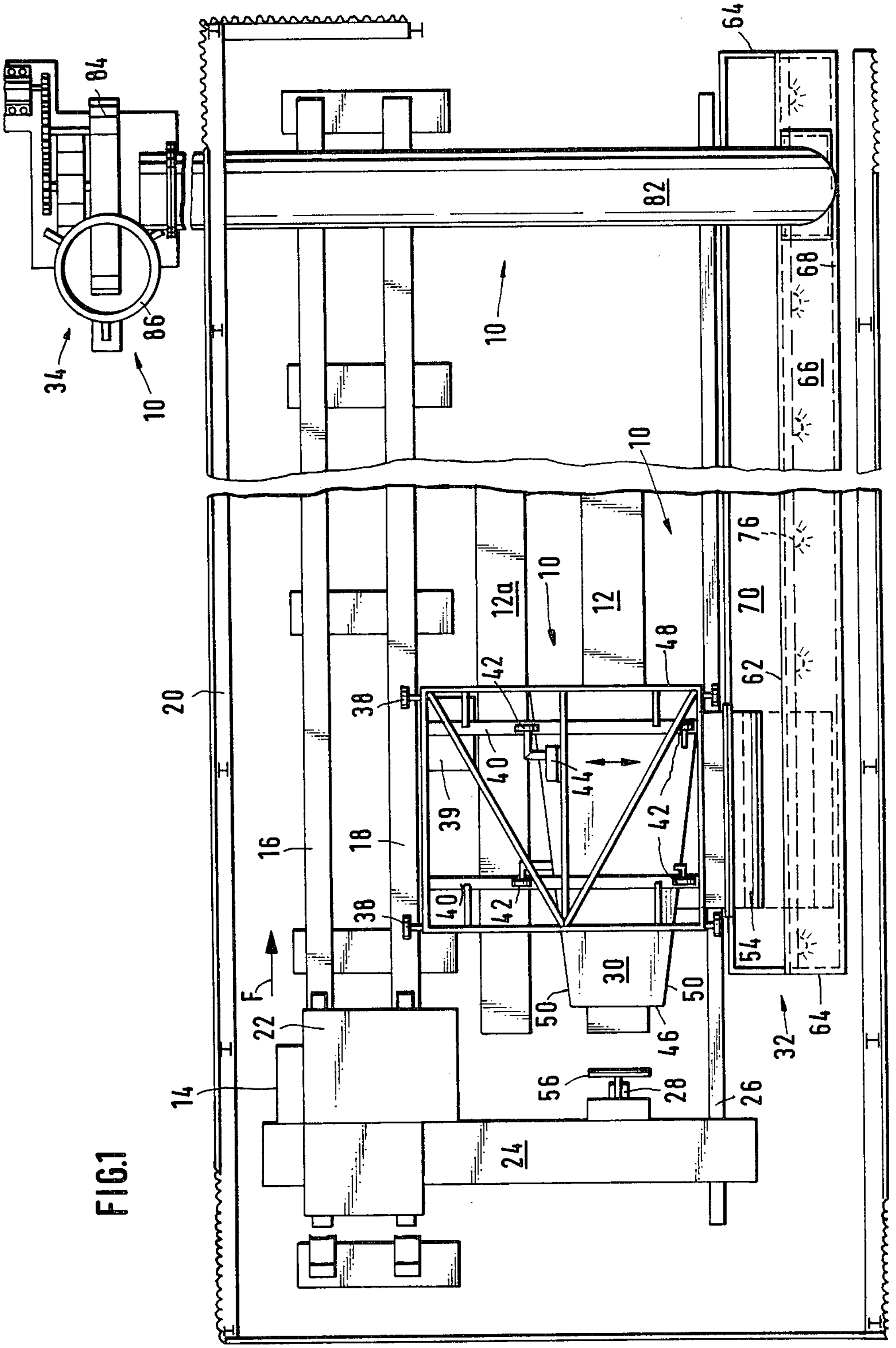
FIG. 1 is a top view of the inventive arrangement connected with a movable flaming or scarfing machine.
Figure 2A:
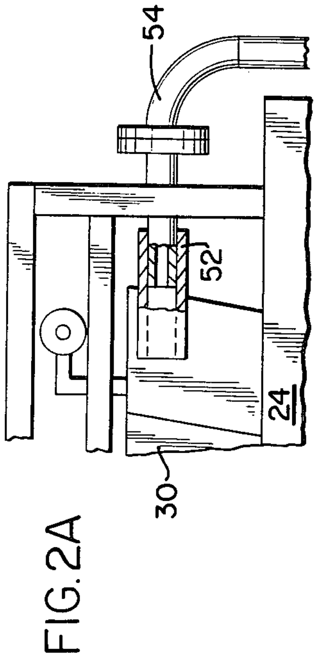
FIG. 2A is a side view of a portion of the device shown in FIG. 2 in a different phase of operation.
Figure 2:
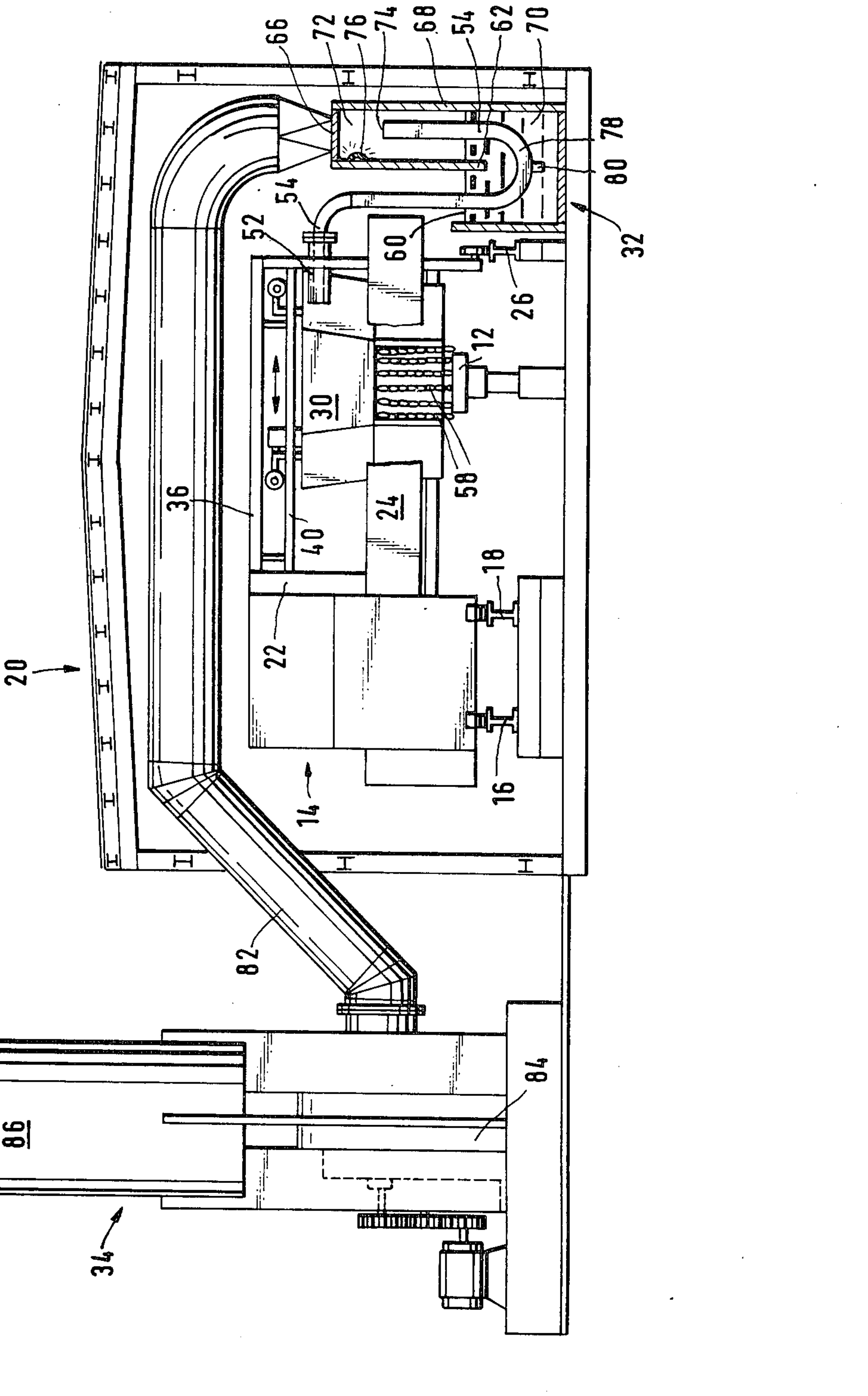
FIG. 2 is a side view from the left of FIG. 1.
Figure 3:
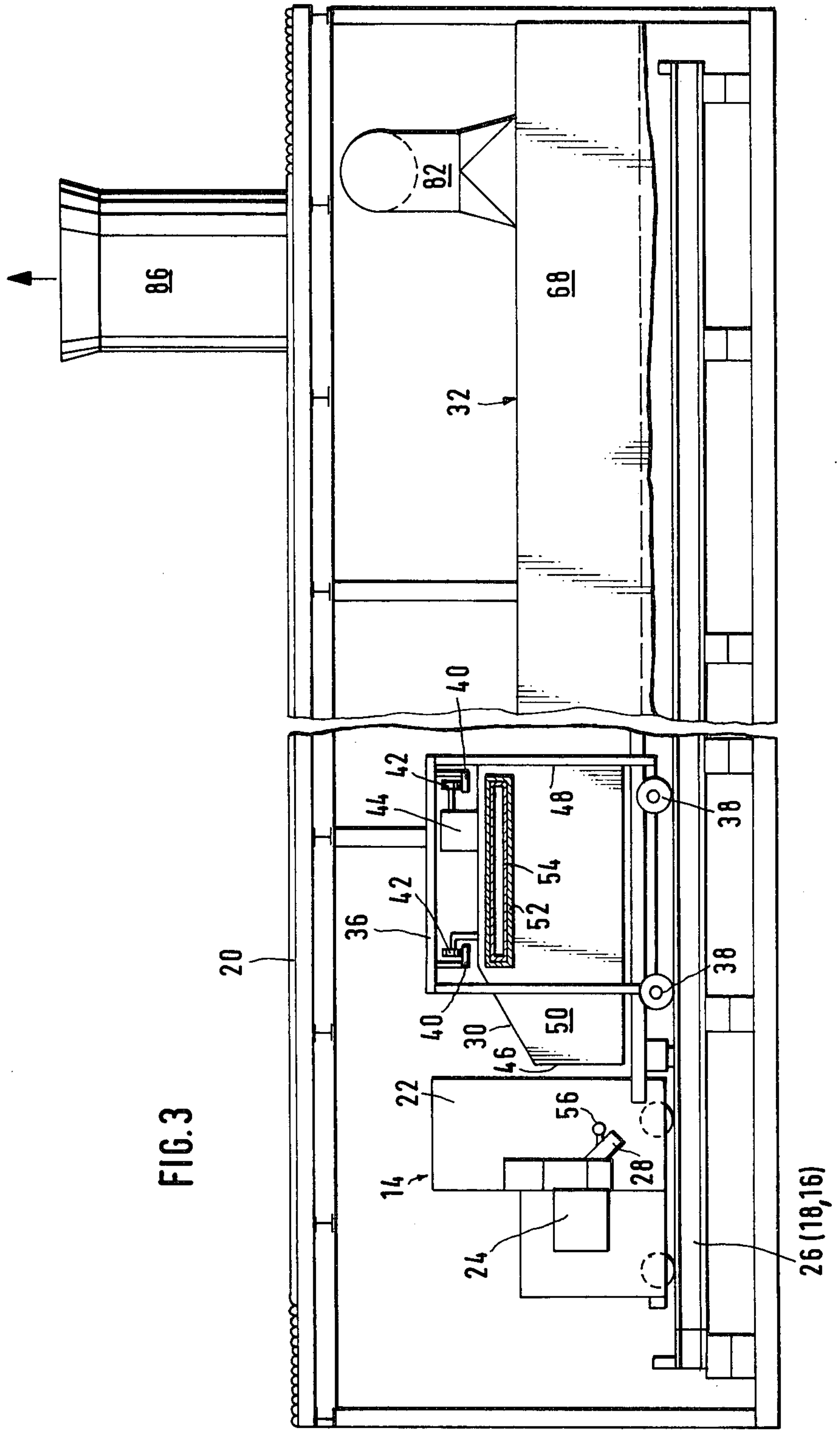
FIG. 3 is a side view from the right of FIG. 2.

In FIGS. 1 to 3, a device 10 according to the invention, for the removal of smoke gases, dust and the like from a workpiece 12 to be flamed is illustrated. The device 10 is connected to a flaming or scarfing machine 14 which is mounted so as to be movable lenthwise on the rails 16, 18 in a workshop 20. The flaming machine 14 has a pilots compartment 22 from which a beam 24 originates which projects over the workpieces to be flamed. This beam can, as shown in FIG. 1, be self-supporting, or likewise especially is of great length, supporting arrangement in the form of a tread roller which travels on a guiding rail 26.

A flame burner 28 is mounted on the beam 24 so as to be transversely movable, that is at right angle to the direction of motion of the flaming machine 14 along the tracks 16, 18 (26) with which the workpiece to be processed is flamed or scarfed selectively or on its entire surface.

As mentioned before and also generally known there results from the flaming, unhealthy smoke gases and dust is stirred up and there is further formed a considerable amount of fluid flame slag which, on account of the kinetic energy of the flame oxygen jet, is often blown up to ten meters from the flaming location into the room.

In the first place, the smoke gases resulting from the flaming process as well as the thereby stirred up dust — being hazardous to health — must be completely removed for the protection of the workers employed in the workshop. For this purpose, the inventive device 10 is hooked up to the movable flaming machine 14.

As can best be seen from FIG. 1, this device 10 consists essentially of three components, namely, a movable suction hood 30, a stationary trough 32 as well as a likewise stationary filter apparatus 34.

The suction hood 30 is, as evident from the drawings, carried by a stable frame 36 which is mounted in movable fashion on the tracks 18, 26 by means of tread rollers 38. In this frame, a drive motor 39 is provided for the tread rollers 38, through which the frame is moved simultaneously according to the lengthwise motion of the flaming machine. This is accomplished in simple manner because both drive motors, from the frame and the flaming machine 14 respectively, are switched on together (for example by an electric synchro-tie). In this manner, it is assured that the frame and the flaming machine will travel constantly with the same speed, in the same direction and at the same distance from one another, on the tracks 16, 18, 26. A mechanical coupling is also possible instead of an electrical one between the flaming machine and the frame.

As evident from FIG. 1, the frame travels together with the suction hood along both tracks 18, 26. But in practice, such as is in metallurgical plants, the movable frame 36 is constantly set up on the tracks which serve at the same time for moving the flaming machine. This has the advantage that in the case of an addition to an already existing flaming machine, no additional track need be installed which is often not possible because of spacing reasons.

According to the length of the beam 24, there is often enough room available in the working area of the flaming machine so that next to the first workpiece 12, one or more workpieces 12*a* can be mounted. The flame burner 28 is then moved transversely along the beam 24 to the adjacent workpiece (block, slabs or the like) and then likewise flames it. In order to, in such a case, effectively be able to suck the smoke gases out of the flaming area, the suction hood 30 is mounted according to the invention, so as to be transversely movable — with reference to flame direction F — in frame 36. For this purpose, two transverse tracks 40 are provided on the top side of the frame, on which the suction hood is suspended in a movable way by means of its tread rollers 42, comparable to the trolley or traveling winch of a crane. The suction hood is moved along the tracks 40 inside the frame 36 by means of a motor 44. This motor is likewise connected controlwise with the transverse drive of the flame burner 28 so that it is assured that in case of a transverse motion of the flame burner 28 along the beam 24, the suction hood 30 is likewise shifted in a corresponding manner.

In place of the motor 44, it is also possible to undertake the transverse motion of the suction hood 30 hydraulically or pneumatically.

As is, above all, evident from FIG. 1, the suction hood 30 has a conical shape, in accordance with which, the smaller face 46 is opened toward the flame burner 28. The wider face 48 of the suction hood is closed and works together with both side plates 50 as a collecting chamber for the smoke gases to be sucked in and away. The bottom section of the suction hood which not only is opened toward the flame burner but also is fully open to the side toward the workpiece extends upwards up to the tracks 40. In this cover section, an outlet duct 52 is laterally and stationarily mounted through which the accumulating smoke gases in the suction hood are sucked away. The outlet duct 52 serves to include a first duct 54 which is firmly attached to the frame 36. This first duct 54 is mounted in the outlet duct 52 insofar that also with the outermost setting of the transversely movable suction hood (in FIG. 2 left) inside of the frame 36, the duct 54 is enveloped by the outlet 52 and is essentially gas tight. Between the two ducts, there is thus a telescoping connection. FIG. 2 illustrates duct 54 completely telescoped into duct 52 while FIG. 2A illustrates the telescopic arrangement with duct 54 partially withdrawn from duct 52.

As already mentioned, there occurs when flaming, besides smoke gases, flame slag in considerable amount, which are immediately granulated behind the flaming zone by means of water nozzles 56 and which on account of the kinetic energy of the flame oxygen jet are carried out of the flaming zone by it. The flamed slag thereby spray out still in glowing condition into the suction hood and arrives into contact with a so-called chain curtain 58, which is installed in the areas of the side plate 50 as well as of the front plate for wide face 48 inside the suction hood. The length of an individual chain is so measured that the middle chains (associated with the front plate for wide face 48) slide on the workpiece, whereas the side chains (associated with the side plates 50) on the side of the workpiece, downward and past. The slag particles thrown against these chains are braked in their path and fall on the workpiece or past it and onto the floor. The slag particles accumulating on the workpiece surface are blown away by the flame oxygen jet and fall at the end of the flame path, (the edge of the workpiece) likewise onto the floor or into an available slag receptacle.

As previously explained, the smoke gases as well as the stirred up solid particles (dust or the like) which accumulate in the suction hood 30, are led into the first duct 54 by the outlet duct 52. The duct 54 projects with its free end into the trough 32.

The trough 32 has a length which is in accord with the flame path and has an extended inlet opening 60 over this total length. This inlet opening limited by a partition wall 62 which projects freely downward into the trough and is only held by end plates 64 as well as by the cover plate 66 which is itself connected with a rear wall.

In this trough, as shown in FIG. 2, a water bath 70 is provided, the level of which is continually held so as to have the bottom end of the partition wall 62 under water. In this way, a syphon-like water seal is obtained by which a chamber 72 is formed which is bordered by the walls 62, 66 and 68 as well as by the surface of the water bath.

The U-shaped bent first duct 54, whose outlet opening 74 is constantly above the water bath, discharges into this chamber, as is evident from FIG. 2.

On at least one of the two walls 62 and/or 68, a water line is laid lengthwise. This water line exhibits numerous orifices distributed over its entire length, from which water under pressure sprays forth and thereby builds a water mist in the chamber 72, by means of which the solid materials presnet in the smoke gases (such as dust and small slag particles) are bound and finally taken up by the water bath.

Part of the spray water goes directly to the first duct 54 via the outlet opening 74 and collects at the pipe bend 78. In order to prevent this water from completely closing the pipe bend 78, a drain plug screw 80 is provided by which the accumulated water is drained at regular intervals and, namely, preferably simultaneously with the changing of the water in the trough.

At the one end of the trough, in the cover plate, a second duct 82 is provided through which the accumulated and pre-cleaned smoke gas is sucked away, namely by means of a stationary vacuum fan 84.

This vacuum fan, a ventilator, thus suctions smoke gases resulting on the workpiece upon flaming together with pulled along dust and slag particles via the suction hood 30, the ducts 52, 54, the chamber 70 as well as the second duct 82 and conducts them further into a subsequent filter 86 of the filtration apparatus 84. By means of this filter, preferably a wet filter, not only are the residual solid particles present in the smoke gases filtered out (the main bulk of the dust and slag particles were already removed in the chamber 72 by the spray arrangement 76) but above all, the health hazardous gaseous components of the smoke gases are removed, so that finally, air cleansed of all harmful materials and thereby environmentally acceptable escapes into the surroundings.

By means of the inventive device described above, the harmful smoke gases as well as dust and smaller slag particles which are pulled along by the sucked off smoke gases can thus be feasibly and completely removed from the flaming zone in the workshop and cleansed by a filtration system (spray device 76 as well as filter 86) so that the air escaping from the filtration apparatus 34 no longer has any health hazardous components.

What is claimed is:

1. In a movable scarfing device for scarfing workpieces such as slabs, blocks and the like, having a scarfing machine with a scarfing torch movable in a longitudinal scarfing direction for movement over the workpiece being scarfed and with a suction hood being mounted in front of the torch with respect to the scarfing direction and movably therewith for removing smoke gases, dust and the like during the scarfing operation, the improvement being a frame movable mounted across said scarfing direction perpendicular thereto, said suction hood being mounted to said frame for movement perpendicular to said scarfing direction, an elongate trough mounted in said scarfing direction for being besides and parallel to the workpiece, said trough being divided into an inlet opening and a closed chamber communicating therewith, a sealing liquid in said trough, a U-shaped duct extending from said suction hood through said inlet opening and said U-shaped duct being opened into said closed chamber, a second duct connected at one end to the interior of said closed chamber, said second duct having its opposite end as a free end, said free end having a filter apparatus therein and being vented to the atmosphere, and at least one chain curtain which reaches to the workpiece being scarfed being mounted inside said suction hood.

2. A device according to claim 1 wherein said trough comprises a receptacle extending over the entire length of the scarfing path and having an inlet opening equipped to steadily take up said lengthwise movable U-shaped duct which is attached to said frame.

3. A device according to claim 2 wherein said liquid is a water bath being provided in said trough as a seal for said closed chamber.

4. A device according to claim 3 wherein said U-shaped duct has an outlet opening discharging into the area of said trough which is sealed by said water bath.

5. A device according to claim 2 wherein a spray arrangement is mounted to at least one of the enclosing walls of the water free area of said trough.

6. A device according to claim 5 wherein said free end of said second duct has a stationary vacuum fan connected to said water free area of said trough.

7. A device according to claim 6 wherein a filter is mounted to and downstream from said vacuum fan.

8. In a movable scarfing device for scarfing longitudinal workpieces such as slabs, blocks and the like, having a scarfing machine with a scarfing torch movable over the workpiece being scarfed and having a removal device with a suction hood for removing smoke gases, dust and the like during the scarfing operation, the improvement being support means for supporting the workpiece in a generally horizontal plane, elongated rail means, said scarfing machine being movably mounted on said rail means for longitudinal movement, said direction of longitudinal movement defining a scarfing direction, said scarfing torch being mounted above said workpiece support means with its flame directed toward said horizontal plane for contacting the workpiece along a liner longitudinal path in said horizontal plane as said scarfing machine moves on said rail means, said scarfing torch being laterally movable in respect to said longitudinal scarfing movement of the scarfing movement of the scarfing machine for scarfing a plurality of said linear paths arranged side by side in accordance with the width of the workpiece and the number of workpieces being scarfed, said removal device being mounted on said rail means and coupled to said scarfing machine for movement therewith in said longitudinal scarfing direction, said removal device including a frame mounted across and above said rail means, said suction hood being mounted in front of said torch in alignment therewith along said scarfing direction, said suction hood being movably mounted to said frame for a transversal lateral movement to said scarfing direction, an elongate trough mounted in said scarfing direction for being besides and parallel to the workpieces, said trough being divided into an inlet opening and a closed chamber communicating therewith, a sealing liquid in said trough, a U-shaped duct extending from said suction hood through said inlet opening, said U-shaped duct opening into and communicating with said closed chamber, said U-shaped duct including extensible means for maintaining communication between said suction hood and said trough to accommodate any transversal lateral movement of said suction hood in respect to said longitudinal movement of the scarfing machine, a second duct connected at one end to the interior of said closed chamber, said second duct having its opposite end as a free end, and said free end having a filter apparatus therein and being vented to the atmosphere.

9. A device according to claim 8 wherein said movable frame is made movable on said rail track means by means of tread rollers.

10. A device according to claim 8 wherein said suction hood is cone shaped with a smaller face and a wider face and said smaller face of said suction hood being opened toward said torch.

11. A device according to claim 8 wherein said U-shaped duct is mounted to the upper end of said suction hood.

* * * * *